(12) United States Patent
Tsai et al.

(10) Patent No.: US 12,112,527 B2
(45) Date of Patent: Oct. 8, 2024

(54) METHOD AND DEVICE FOR DETECTING DEFECTS, ELECTRONIC DEVICE USING METHOD, AND NON-TRANSITORY STORAGE MEDIUM

(71) Applicant: HON HAI PRECISION INDUSTRY CO., LTD., New Taipei (TW)

(72) Inventors: Tung-Tso Tsai, New Taipei (TW); Chin-Pin Kuo, New Taipei (TW); Tzu-Chen Lin, New Taipei (TW); Shih-Chao Chien, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 427 days.

(21) Appl. No.: 17/564,512

(22) Filed: Dec. 29, 2021

(65) Prior Publication Data

US 2022/0207867 A1 Jun. 30, 2022

(30) Foreign Application Priority Data

Dec. 30, 2020 (CN) .......................... 202011615846.8

(51) Int. Cl.
*G06V 10/778* (2022.01)
*G06N 3/04* (2023.01)
(Continued)

(52) U.S. Cl.
CPC ........... *G06V 10/7796* (2022.01); *G06N 3/04* (2013.01); *G06T 7/0002* (2013.01);
(Continued)

(58) Field of Classification Search
CPC .... G06V 10/7796; G06V 10/82; G06V 10/95; G06V 10/774; G06N 3/04; G06T 7/0002;
(Continued)

(56) References Cited

U.S. PATENT DOCUMENTS 10,970,604 B2 4/2021 Huang
2020/0364860 A1* 11/2020 Kearney ................ G16H 30/40

FOREIGN PATENT DOCUMENTS

CN 105550712 A 5/2016
CN 110796637 A 2/2020
(Continued)

*Primary Examiner* — Quang N Vo
(74) *Attorney, Agent, or Firm* — ScienBiziP, P.C.

(57) ABSTRACT

In a method for defecting surface defects, a trained weighting generated when defect-free training samples are used to train an autoencoder and pixel convolutional neural network is obtained. A test encoding feature is obtained by inputting the trained weighting into the autoencoder and pixel convolutional neural network and a weighted autoencoder of the weighted autoencoder and pixel convolutional neural network encoding a test sample. The test encoding feature is input into a weighted pixel convolution neural network of the weighted autoencoder and pixel convolutional neural network to output a result of test. The test result is either no defect in the test sample or at least one defect in the test sample. Inaccurate determinations as to defects are thereby avoided. An electronic device and a non-transitory storage medium are also disclosed.

20 Claims, 5 Drawing Sheets

(51) Int. Cl.
*G06T 7/00* (2017.01)
*G06V 10/774* (2022.01)
*G06V 10/82* (2022.01)
*G06V 10/94* (2022.01)

(52) U.S. Cl.
CPC ............ *G06V 10/774* (2022.01); *G06V 10/82* (2022.01); *G06V 10/95* (2022.01); *G06T 2207/20081* (2013.01); *G06T 2207/20084* (2013.01); *G06T 2207/30168* (2013.01)

(58) Field of Classification Search
CPC . G06T 2207/20081; G06T 2207/20084; G06T 2207/30168
USPC .......................................................... 382/157
See application file for complete search history.

(56) References Cited

FOREIGN PATENT DOCUMENTS

| | | | | |
|---|---|---|---|---|
| CN | 112036513 A | 12/2020 | | |
| EP | 3660747 A1 * | 6/2020 | ............... | G06N 3/04 |
| TW | 202013549 A | 4/2020 | | |

* cited by examiner

METHOD AND DEVICE FOR DETECTING DEFECTS, ELECTRONIC DEVICE USING METHOD, AND NON-TRANSITORY STORAGE MEDIUM

FIELD

The subject matter herein generally relates to quality control particularly, to a method and a device for detecting defects, an electronic device using method, and a non-transitory storage medium.

BACKGROUND

To detect defects, a test sample is input into a trained autoencoder to construct an image corresponding to the test sample, and whether the test sample has defect is determined according to a difference between the constructed image and the test sample. However, noise may be included in the test sample, thus the determination of defects may be inaccurate.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
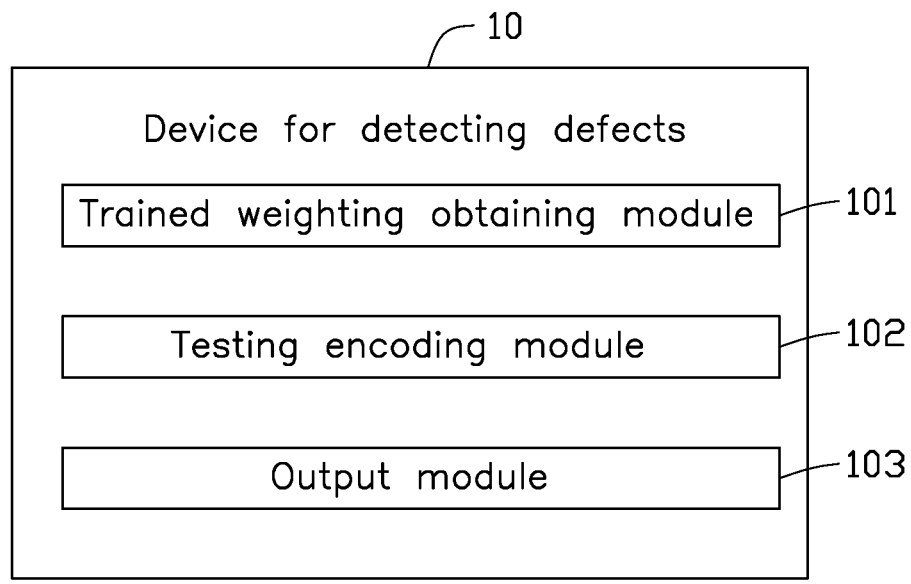
FIG. 1 illustrates a block diagram of a device for detecting defects in a first embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, referencing the accompanying drawings, is illustrated by way of examples and not by way of limitation. It should be noted that references to "an" or "one" embodiment in this disclosure are not necessarily to the same embodiment, and such references mean "at least one."

FIG. 1 illustrates a device for detecting defects in a first embodiment. The device for detecting defects 10 can be applied in an electronic device. The electronic device can be a smart phone, a desktop computer, a tablet computer, or the like. The device for detecting defects 10 can include a trained weighting obtaining module 101, a testing encoding module 102, and an output module 103. The trained weighting obtaining module 101 is configured to obtain a trained weighting generated when an autoencoder and pixel convolutional neural network is being trained with a number of defect-free training samples. The testing encoding module 102 is configured to input the trained weighting into the autoencoder and pixel convolutional neural network to obtain a test encoding feature by a weighted autoencoder of the weighted autoencoder and pixel convolutional neural network encoding a test sample. The output module 103 is configured to input the test encoding feature into a weighted pixel convolution neural network of the weighted autoencoder and pixel convolutional neural network to output a test result. The test result is either no defect in the test sample or at least one defect in the test sample.

Figure 2:
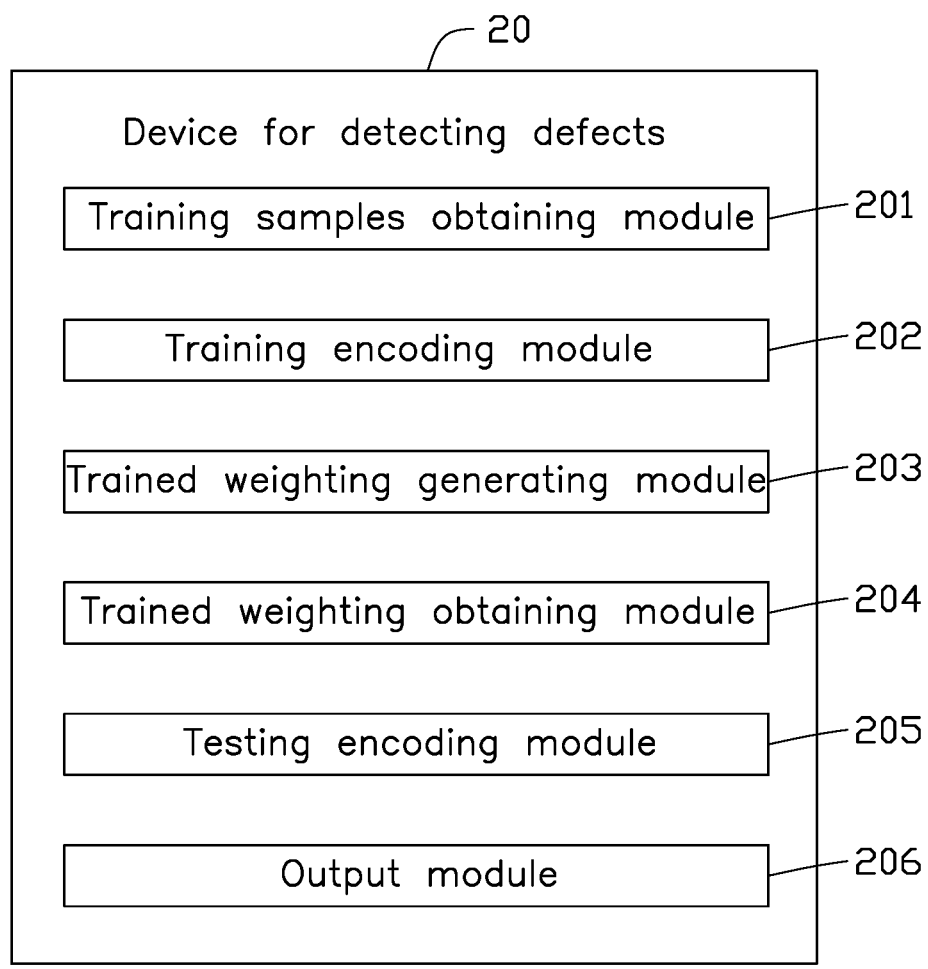
FIG. 2 illustrates a block diagram of a device for detecting defects in a second embodiment of the present disclosure.

FIG. 2 illustrates a block diagram of a device for detecting defects in a second embodiment. The device for detecting defects 20 can be applied in an electronic device. The electronic device can be a smart phone, a desktop computer, a tablet computer, or the like. The device for detecting defects 20 can include a training samples obtaining module 201, a training encoding module 202, a trained weighting generating module 203, a trained weighting obtaining module 204, a testing encoding module 205, and an output module 206. The training samples obtaining module 201 is configured to obtain a number of defect-free training samples. The training encoding module 202 is configured to input the defect-free training samples into an autoencoder of an autoencoder and pixel convolutional neural network to obtain a number of training encoding features by the autoencoder encoding the defect-free training samples. The trained weighting generating module 203 is configured to perform training by inputting the training encoding features into a pixel convolutional neural network of the autoencoder and pixel convolutional neural network to generate a trained weighting of the autoencoder and pixel convolutional neural network. The trained weighting obtaining module 204 is configured to obtain the trained weighting generated when the autoencoder and pixel convolutional neural network is being trained with the defect-free training samples. The testing encoding module 205 is configured to input the trained weighting into the autoencoder and pixel convolutional neural network to obtain a test encoding feature by a weighted autoencoder of the weighted autoencoder and pixel convolutional neural network encoding a test sample. The output module 206 is configured to input the test encoding feature into a weighted pixel convolution neural network of the weighted autoencoder and pixel convolutional neural network to output a test result. The test result is either no defect in the test sample or at least one defect in the test sample.

Details of the functions of the modules 101~103 and modules 201~206 will be described.

Figure 3:
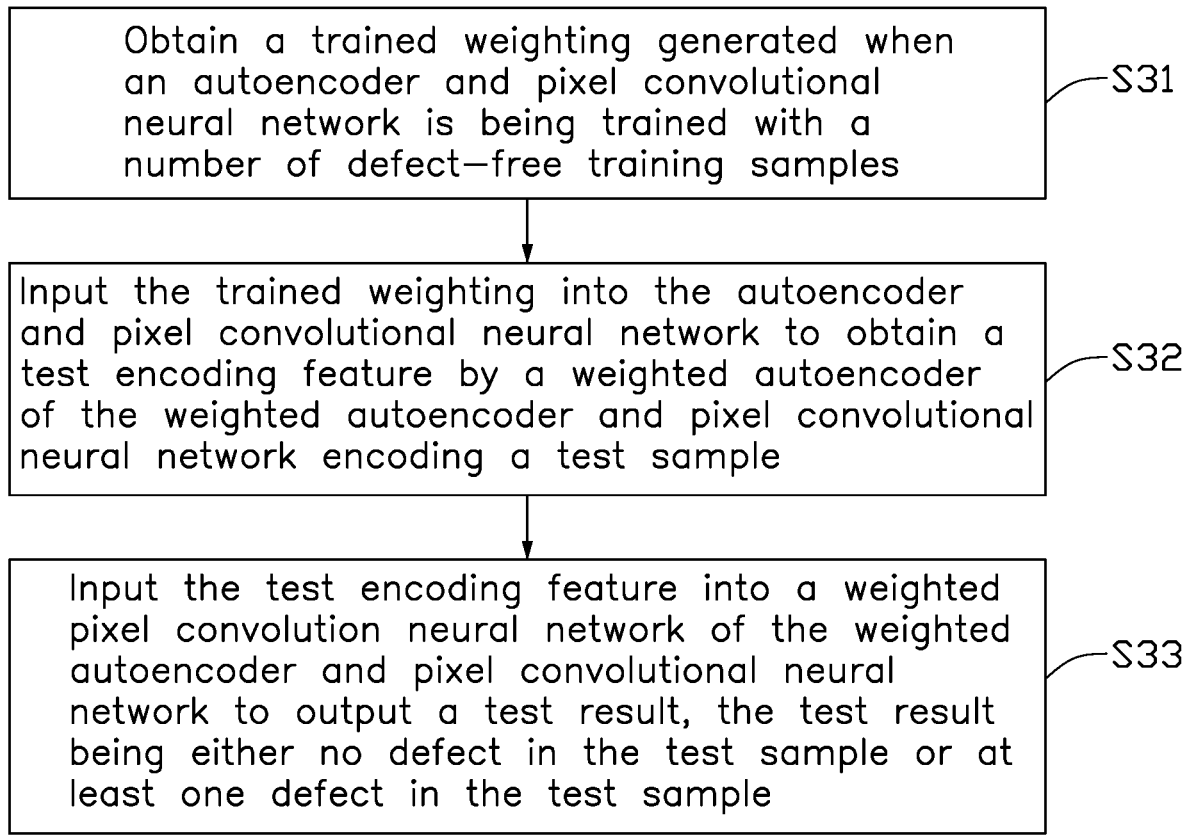
FIG. 3 illustrates a flowchart of a method for detecting defects in a first embodiment of the present disclosure.

FIG. 3 is a flowchart of a method for detecting defects in a first embodiment. The method for detecting defects can include the following:

At block S31, obtaining a trained weighting generated when an autoencoder and pixel convolutional neural network is being trained with a number of defect-free training samples.

The defect-free training samples are images of a defect-free surface of a product. The autoencoder and pixel convolutional neural network is an architecture of the autoencoder based on the pixel convolutional neural network, namely an architecture of the autoencoder adding the pixel convolutional neural network. The trained weighting is an optimal weight during training the architecture of the autoencoder based on the pixel convolutional neural network.

At block S32, inputting the trained weighting into the autoencoder and pixel convolutional neural network to obtain a test encoding feature by a weighted autoencoder of the weighted autoencoder and pixel convolutional neural network encoding a test sample.

The autoencoder can include an encoder. The test encoding feature is a feature generated when the test sample is being encoded by the encoder of the weighted autoencoder of the weighted autoencoder and pixel convolutional neural network, namely a hidden layer feature. The test encoding feature is the essence of the test sample, and noise of the test sample is removed. The inputting the trained weighting into the autoencoder and pixel convolutional neural network can generate a trained architecture of the autoencoder based on the pixel convolutional neural network, namely can generate a weighted autoencoder and pixel convolutional neural network. The test sample is a test image of the surface of the product.

At block S33, inputting the test encoding feature into a weighted pixel convolution neural network of the weighted autoencoder and pixel convolutional neural network to output a test result, the test result being either no defect in the test sample or at least one defect in the test sample.

In the embodiment, the pixel convolution neural network includes a convolution kernel, a number of residual modules, a number of convolution layers, and a softmax layer connected in sequence. The convolution kernel is the convolution kernel with a size of 7×7. The pixel convolutional neural network can extract a feature of the test encoding feature via the convolution kernel with a size of 7×7 connecting with the input test encoding feature. The residual modules are configured to process the extracted feature of the test encoding feature. Each of the convolution layers is a convolution layer with a size of 1×1. In the embodiment, two convolution layers with a size of 1×1 are employed. An output layer of the pixel convolution neural network is the softmax layer. The pixel convolution neural network outputs the probability value via the softmax layer.

The inputting of the test encoding feature into a weighted pixel convolution neural network of the weighted autoencoder and pixel convolutional neural network to output a test result includes a step a1 and a step a2. The step a1 includes inputting the test encoding feature into a weighted pixel convolution neural network of the weighted autoencoder and pixel convolutional neural network to output a probability value. The step a2 includes outputting the test result according to the probability value. In the embodiment, if the probability value approaches 0, the test result is no defect in the test sample. If the probability value approaches 1, the test result is at least one defect in the test sample. If the probability value approaches 0, preferably the probability value is 0, 0.01, 0.02, or other value according to specific requirements. If the probability value approaches 1, preferably the probability value is 1, 0.99, 0.98, or other value according to specific requirements.

In the disclosure, a trained weighting generated when an autoencoder and pixel convolutional neural network is being trained with defect-free training samples is obtained. The disclosure obtains a test encoding feature by inputting the trained weighting into the autoencoder and pixel convolutional neural network and a weighted autoencoder of the weighted autoencoder and pixel convolutional neural network encoding a test sample. The disclosure inputs the test encoding feature into a weighted pixel convolution neural network of the weighted autoencoder and pixel convolutional neural network to output a test result. The test result is either no defect in the test sample or at least one defect in the test sample. Thus, the disclosure can directly use essence of the test sample to determine whether a defect exists in the test sample, but not directly use the test sample to determine whether a defect exists. The disclosure also does not need to compare with the test sample. Thus, an influence of noise of the test sample can be avoided, and an inaccurate determination of the defect can be avoided.

Figure 4:
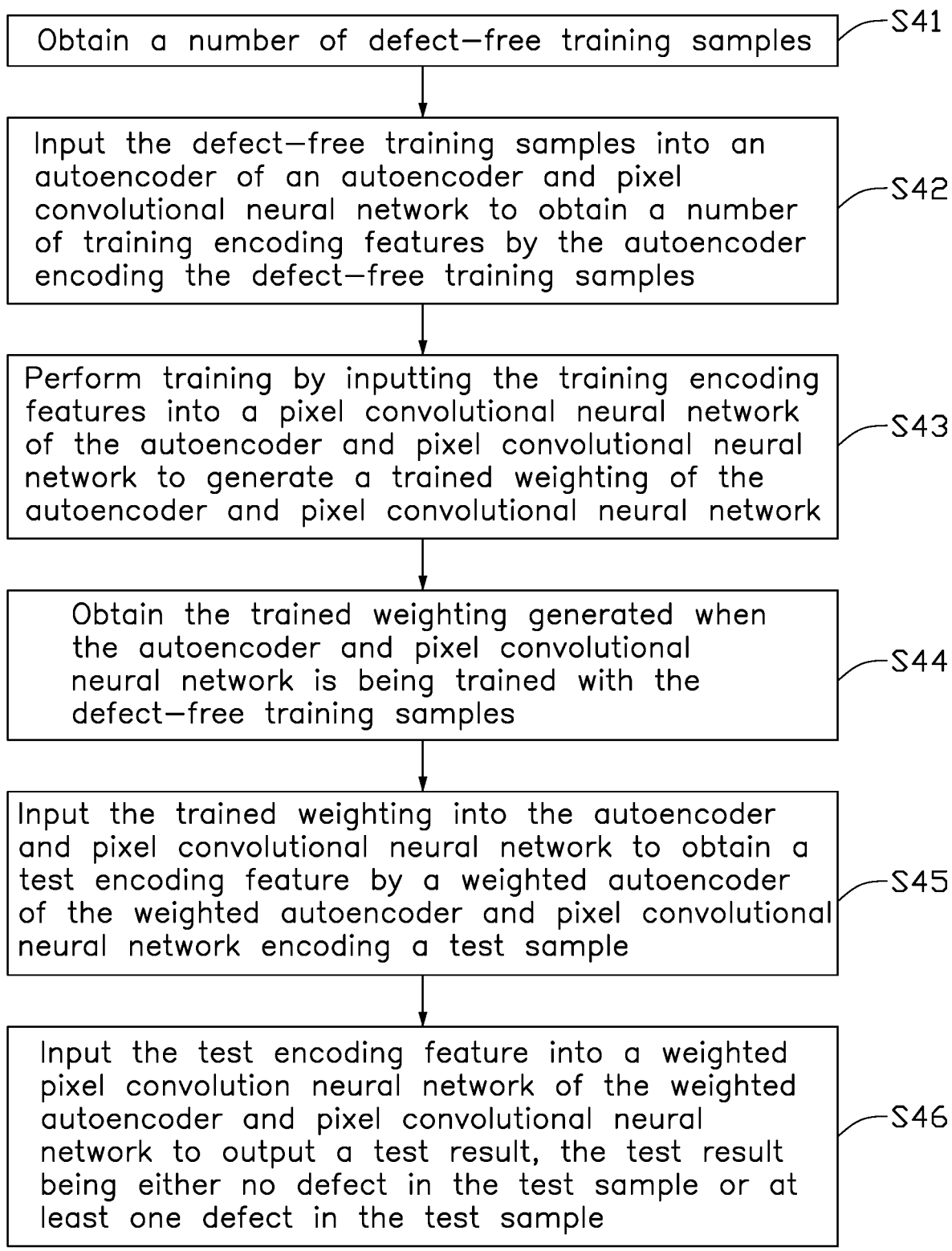
FIG. 4 illustrates a flowchart of a method for detecting defects in a second embodiment of the present disclosure.

FIG. 4 is a flowchart of a method for detecting defects in a second embodiment. This method for detecting defects can include the following:

At block S41, obtaining a number of defect-free training samples.

The defect-free training samples are images of a defect-free surface of a product.

At block S42, inputting the defect-free training samples into an autoencoder of an autoencoder and pixel convolutional neural network to obtain a number of training encoding features by the autoencoder encoding the defect-free training samples.

The autoencoder can include an encoder. Each training encoding feature is a feature generated when the test sample is being encoded by the encoder of the weighted autoencoder of the weighted autoencoder and pixel convolutional neural network, namely a hidden layer feature. Each test encoding feature is an essence of the test sample, and noise of the test sample is removed. The autoencoder and pixel convolutional neural network is an architecture of the autoencoder based on the pixel convolutional neural network, namely an architecture of the autoencoder adding the pixel convolutional neural network.

At block S43, performing training by inputting the training encoding features into a pixel convolutional neural network of the autoencoder and pixel convolutional neural network to generate a trained weighting of the autoencoder and pixel convolutional neural network.

The trained weighting is the weight corresponding to a loss function when the loss function is continuously iterated until the architecture is converged during training the architecture of the autoencoder based on the pixel convolutional neural network, namely during training the autoencoder and the pixel convolutional neural network.

At block S44, obtaining the trained weighting generated when the autoencoder and pixel convolutional neural network is being trained with the defect-free training samples.

The block S44 of the second embodiment is the same as the block S31 of the first embodiment, details thereof are as the description of the block S31 of the first embodiment, and are not repeated.

At block S45, inputting the trained weighting into the autoencoder and pixel convolutional neural network to obtain a test encoding feature by a weighted autoencoder of the weighted autoencoder and pixel convolutional neural network encoding a test sample.

The block S45 of the second embodiment is the same as the block S32 of the first embodiment, details thereof are as the description of the block S32 of the first embodiment, and are not repeated.

At block S46, inputting the test encoding feature into a weighted pixel convolution neural network of the weighted autoencoder and pixel convolutional neural network to output a test result, the test result being either no defect in the test sample or at least one defect in the test sample.

The block S46 of the second embodiment is the same as the block S33 of the first embodiment, details thereof are as the description of the block S33 of the first embodiment, and are not repeated.

In the disclosure, a number of defect-free training samples are obtained, and a number of training encoding features are obtained by inputting the defect-free training samples into an autoencoder of an autoencoder and pixel convolutional neural network and the autoencoder encoding the defect-free training samples. The disclosure performs training by inputting the training encoding features into a pixel convolutional neural network of the autoencoder and pixel convolutional neural network to generate a trained weighting of the autoencoder and pixel convolutional neural network. Further, in the disclosure, a trained weighting generated when an autoencoder and pixel convolutional neural network is being trained with defect-free training samples is obtained. The disclosure further obtains a test encoding feature by inputting the trained weighting into the autoencoder and pixel convolutional neural network and a weighted autoencoder of the weighted autoencoder and pixel convolutional neural network encoding a test sample. The disclosure also inputs the test encoding feature into a weighted pixel convolution neural network of the weighted autoencoder and pixel convolutional neural network to output a test result. The test result is either no defect in the test sample or at least one defect in the test sample. Thus, the disclosure can generate the trained weighting by using the defect-free training samples to train the architecture of the autoencoder based on the pixel convolutional neural network. The disclosure can further directly use essence of the test sample to determine whether defect exists in the test sample, but not directly use the test sample to so determine. The disclosure also does not need a comparison with the test sample. Thus, noise which might influence the test sample can be avoided, and an inaccurate determination of the defect can be avoided.

Figure 5:
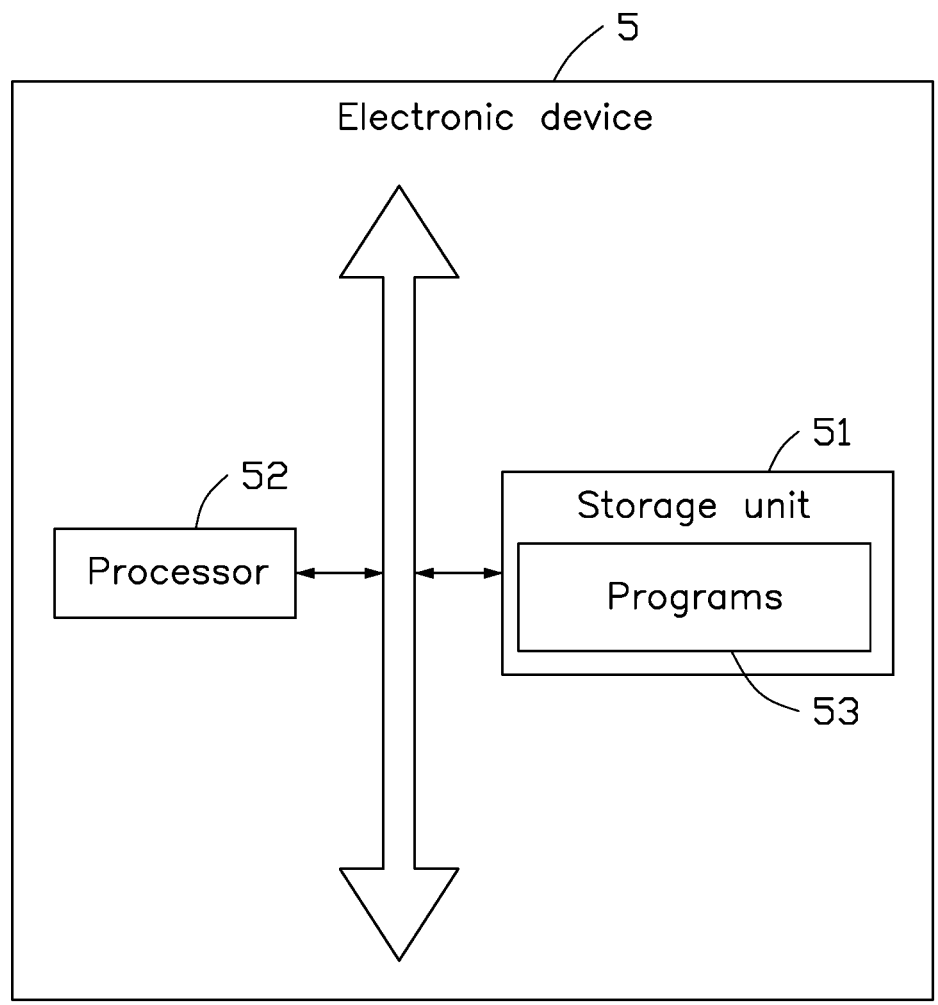
FIG. 5 illustrates a block diagram of an electronic device in an embodiment of the present disclosure.

FIG. 5 illustrates a block diagram of an electronic device in an embodiment. The electronic device 5 can include a storage unit 51, at least one processor 52, and one or more programs 53 stored in the storage unit 51 which can be run on the at least one processor 52. The at least one processor 52 can execute the one or more programs 53 to accomplish the blocks of the exemplary method. Or the at least one processor 52 can execute the one or more programs 53 to accomplish the functions of the modules of the exemplary device.

The one or more programs 53 can be divided into one or more modules/units. The one or more modules/units can be stored in the storage unit 51 and executed by the at least one processor 52 to accomplish the purpose of the method. The one or more modules/units can be a series of program command segments which can perform specific functions, and the command segment is configured to describe the execution process of the one or more programs 53 in the electronic device 5. For example, the one or more programs 53 can be divided into modules as shown in the FIG. 1 and the FIG. 2, the functions of each module are as described in the first embodiment and the second embodiment.

The electronic device 5 can be any suitable electronic device, for example, a personal computer, a tablet computer, a mobile phone, a PDA, or the like. A person skilled in the art knows that the device in FIG. 5 is only an example and is not to be considered as limiting of the electronic device 5, another electronic device 5 may include more or fewer parts than the diagram, or may combine certain parts, or include different parts, such as more buses, electronic device 5, and so on.

The at least one processor 52 can be one or more central processing units, or it can be one or more other universal processors, digital signal processors, application specific integrated circuits, field-programmable gate arrays, or other programmable logic devices, discrete gate or transistor logic, discrete hardware components, and so on. The at least one processor 52 can be a microprocessor or the at least one processor 52 can be any regular processor or the like. The at least one processor 52 can be a control center of the electronic device 5, using a variety of interfaces and lines to connect various parts of the entire electronic device 5.

The storage unit 51 stores the one or more programs 53 and/or modules/units. The at least one processor 52 can run or execute the one or more programs and/or modules/units stored in the storage unit 51, call out the data stored in the storage unit 51 and accomplish the various functions of the electronic device 5. The storage unit 51 may include a program area and a data area. The program area can store an operating system, and applications that are required for the at least one function, such as sound or image playback features, and so on. The data area can store data created according to the use of the electronic device 5, such as audio data, and so on. In addition, the storage unit 51 can include a non-transitory storage medium, such as hard disk, memory, plug-in hard disk, smart media card, secure digital, flash card, at least one disk storage device, flash memory, or another non-transitory storage medium.

If the integrated module/unit of the electronic device 5 is implemented in the form of or by means of a software functional unit and is sold or used as an independent product, all parts of the integrated module/unit of the electronic device 5 may be stored in a computer-readable storage medium. The electronic device 5 can use one or more programs to control the related hardware to accomplish all parts of the method of this disclosure. The one or more programs can be stored in a computer-readable storage medium. The one or more programs can apply the exemplary method when executed by the at least one processor. The one or more stored programs can include program code. The program code can be in the form of source code, object code, executable code file, or in some intermediate form. The computer-readable storage medium may include any entity or device capable of recording and carrying the program codes, recording media, USB flash disk, mobile hard disk, disk, computer-readable storage medium, and read-only memory.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claim.

What is claimed is:

1. A method for detecting defects comprising:
obtaining a trained weighting generated when an autoencoder and pixel convolutional neural network is being trained with a plurality of defect-free training samples;
inputting the trained weighting into the autoencoder and the pixel convolutional neural network to obtain a test encoding feature; the test encoding feature is obtained by encoding test samples using a weighted autoencoder of the weighted autoencoder and pixel convolutional neural network; the test encoding feature is a feature generated when the test sample is being encoded by the encoder of the weighted autoencoder of the weighted autoencoder and pixel convolutional neural network, a hidden layer feature; and inputting the test encoding feature into the pixel convolution neural network loaded the trained weighting to output a test result, the test result being either no defect in the test sample or at least one defect in the test sample.

2. The method according to claim 1, wherein the autoencoder and pixel convolutional neural network is an architecture of the autoencoder based on the pixel convolutional neural network.

3. The method according to claim 1, wherein the inputting the test encoding feature into a weighted pixel convolution neural network of the weighted autoencoder and pixel convolutional neural network to output a test result comprises:

inputting the test encoding feature into a weighted pixel convolution neural network of the weighted autoencoder and pixel convolutional neural network to output a probability value;

outputting the test result according to the probability value.

4. The method according to claim 3, wherein the output layer of the pixel convolution neural network is a softmax layer.

5. The method according to claim 4, wherein the pixel convolution neural network comprises a convolution kernel with a size of 7×7, a plurality of residual modules, a plurality of convolution layers with a size of 1×1, and the softmax layer connected in sequence.

6. The method according to claim 3, wherein:
if the probability value approaches 0, the test result is no defect in the test sample;
if the probability value approaches 1, the test result is at least one defect in the test sample.

7. The method according to claim 1, wherein the method further comprises:

obtaining a plurality of defect-free training samples;
inputting the defect-free training samples into an autoencoder of the autoencoder and pixel convolutional neural network to obtain a plurality of training encoding features by the autoencoder encoding the defect-free training samples;
performing training by inputting the training encoding features into a pixel convolutional neural network of the autoencoder and pixel convolutional neural network to generate the trained weighting of the autoencoder and pixel convolutional neural network.

8. An electronic device comprising:
a storage device;
at least one processor; and
the storage device storing one or more programs, which when executed by the at least one processor, cause the at least one processor to:
obtain a trained weighting generated when an autoencoder and pixel convolutional neural network is being trained with a plurality of defect-free training samples;
input the trained weighting into the autoencoder and pixel convolutional neural network to obtain a test encoding feature; the test encoding feature is obtained by encoding test samples using a weighted autoencoder of the weighted autoencoder and pixel convolutional neural network; the test encoding feature is a feature generated when the test sample is being encoded by the encoder of the weighted autoencoder of the weighted autoencoder and pixel convolutional neural network, a hidden layer feature; and input the test encoding feature into a weighted pixel convolution neural network of the weighted autoencoder and pixel convolutional neural network to output a test result, the test result being either no defect in the test sample or at least one defect in the test sample.

9. The electronic device according to claim 8, wherein the autoencoder and pixel convolutional neural network is an architecture of the autoencoder based on the pixel convolutional neural network.

10. The electronic device according to claim 8, further causing the at least one processor to:
input the test encoding feature into a weighted pixel convolution neural network of the weighted autoencoder and pixel convolutional neural network to output a probability value;
output the test result according to the probability value.

11. The electronic device according to claim 10, wherein the output layer of the pixel convolution neural network is a softmax layer.

12. The electronic device according to claim 11, wherein the pixel convolution neural network comprises a convolution kernel with a size of 7×7, a plurality of residual modules, a plurality of convolution layers with a size of 1×1, and the softmax layer connected in sequence.

13. The electronic device according to claim 10, wherein:
if the probability value approaches 0, the test result is no defect in the test sample;
if the probability value approaches 1, the test result is at least one defect in the test sample.

14. The electronic device according to claim 8, further causing the at least one processor to:
obtain a plurality of defect-free training samples;
input the defect-free training samples into an autoencoder of the autoencoder and pixel convolutional neural network to obtain a plurality of training encoding features by the autoencoder encoding the defect-free training samples;
perform training by inputting the training encoding features into a pixel convolutional neural network of the autoencoder and pixel convolutional neural network to generate the trained weighting of the autoencoder and pixel convolutional neural network.

15. A non-transitory storage medium storing a set of commands, when the commands being executed by at least one processor of an electronic device, causing the at least one processor to:
obtain a trained weighting generated when an autoencoder and pixel convolutional neural network is being trained with a plurality of defect-free training samples;
input the trained weighting into the autoencoder and pixel convolutional neural network to obtain a test encoding feature; the test encoding feature is obtained by encoding test samples using a weighted autoencoder of the weighted autoencoder and pixel convolutional neural network; the test encoding feature is a feature generated when the test sample is being encoded by the encoder of the weighted autoencoder of the weighted autoencoder and pixel convolutional neural network, a hidden layer feature; and input the test encoding feature into a weighted pixel convolution neural network of the weighted autoencoder and pixel convolutional neural network to output a test result, the test result being either no defect in the test sample or at least one defect in the test sample.

16. The non-transitory storage medium according to claim 15, wherein the autoencoder and pixel convolutional neural network is an architecture of the autoencoder based on the pixel convolutional neural network.

17. The non-transitory storage medium according to claim 15, further causing the at least one processor to:
input the test encoding feature into a weighted pixel convolution neural network of the weighted autoencoder and pixel convolutional neural network to output a probability value;
output the test result according to the probability value.

18. The non-transitory storage medium according to claim 17, wherein the output layer of the pixel convolution neural network is a softmax layer.

19. The non-transitory storage medium according to claim 18, wherein the pixel convolution neural network comprises a convolution kernel with a size of 7×7, a plurality of residual modules, a plurality of convolution layers with a size of 1×1, and the softmax layer connected in sequence.

20. The non-transitory storage medium according to claim 15, further causing the at least one processor to:
obtain a plurality of defect-free training samples;
input the defect-free training samples into an autoencoder of the autoencoder and pixel convolutional neural network to obtain a plurality of training encoding features by the autoencoder encoding the defect-free training samples;
perform training by inputting the training encoding features into a pixel convolutional neural network of the autoencoder and pixel convolutional neural network to generate the trained weighting of the autoencoder and pixel convolutional neural network.

* * * * *